United States Patent [19]
Fujimori et al.

[11] 3,782,834
[45] Jan. 1, 1974

[54] METHOD OF CORRECTING PHOTOELECTRIC MICROSCOPES

[75] Inventors: Ryo Fujimori; Shinichi Kamachi, both of Tokyo, Japan

[73] Assignee: Olympus Optical Company Limited, Tokyo, Japan

[22] Filed: May 12, 1972

[21] Appl. No.: 252,819

[30] Foreign Application Priority Data
May 17, 1971  Japan.............................. 46/32376

[52] U.S. Cl.......... 356/167, 356/225, 250/219 WD, 250/219 L
[51] Int. Cl. ........................................... G01b 11/00
[58] Field of Search................... 356/167, 170, 225, 356/159, 160; 250/219 WD, 219 L

[56] References Cited
UNITED STATES PATENTS

| | | | |
|---|---|---|---|
| 3,565,532 | 2/1971 | Heitmann et al. | 356/167 |
| 3,669,543 | 6/1972 | Vaccaro | 356/225 X |
| 3,709,611 | 1/1973 | Taisne | 356/170 |
| 3,017,801 | 1/1962 | Ingber | 356/159 X |

Primary Examiner—Ronald L. Wibert
Assistant Examiner—Paul K. Godwin
Attorney—Eric H. Waters et al.

[57] ABSTRACT

A method of correcting a photoelectric microscope adapted to generate a photoelectric signal for detecting the end face position of a specimen in which the photoelectric signal is supplied to a pilot meter such, for example, as a conventional voltmeter or ammeter. The pilot meter has a scale with a level for generating the detecting pulse from a wave form shaping circuit marked thereon. The gain of the photoelectric signal is adjusted such that the ratio of the amplitude from the dark level to the level for generating the detecting pulse to the amplitude from the level for generating the detecting pulse to the bright level is made equal to a value defined by the change in the distribution of the quantity of light rays near the end face of the specimen. The level of the photoelectric signal may also be adjusted to obtain the same result. It is preferable to effect the adjustment of both the level and the gain of the photoelectric signal to obtain the ratio equal to the defined value. The desired ratio can be obtained by observing the deflection of an indication needle of the pilot meter. The specimen is moved to be scanned by a slit and a correct detecting pulse is generated at each instant when each edge of the end face of the specimen passes the center of the slit irrespective of possible change of the quantity of light near the end face of the specimen resulting from changes in configuration of and reflecting power at the specimen and in contrast, illumination, etc.

2 Claims, 14 Drawing Figures

FIG_4
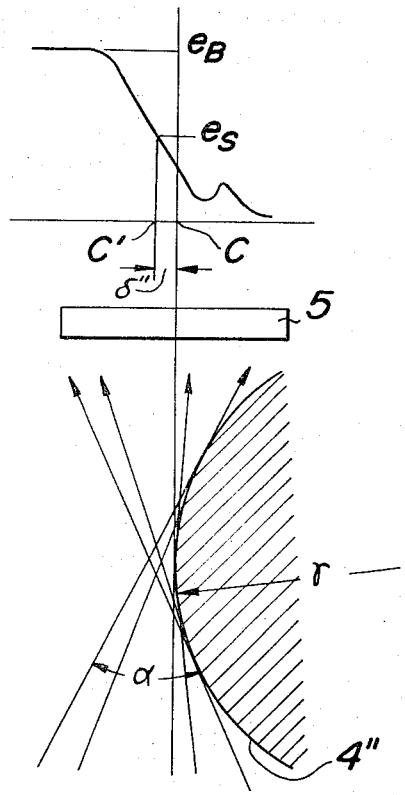
FIG_6
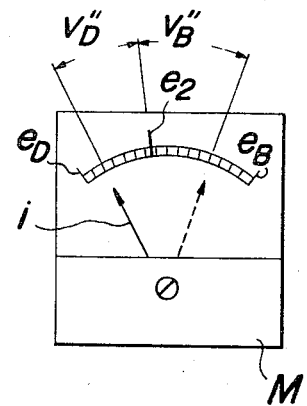
FIG_5
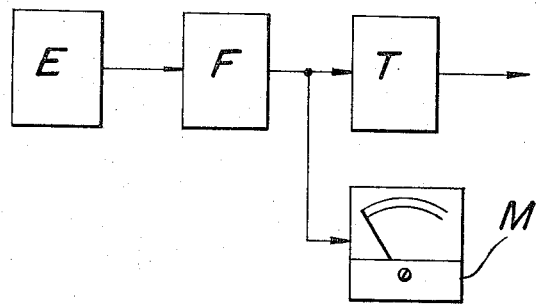

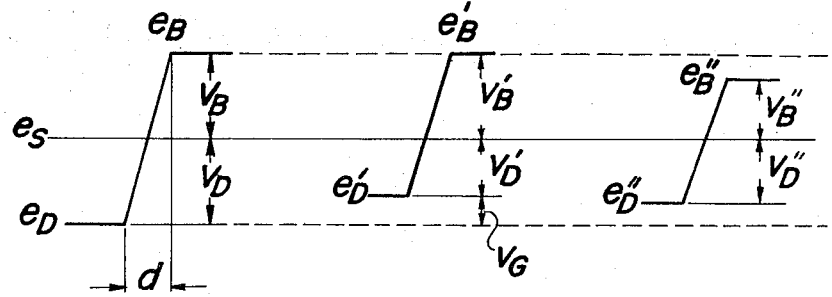
FIG_7a  FIG_7b  FIG_7c
FIG_8
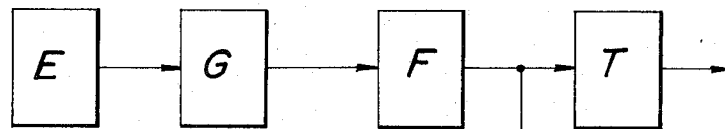
FIG_9
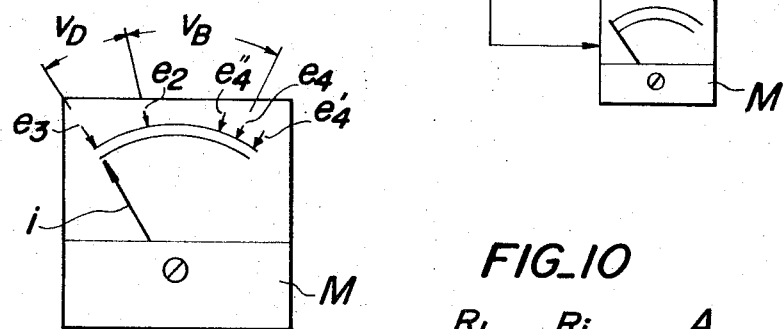
FIG_10
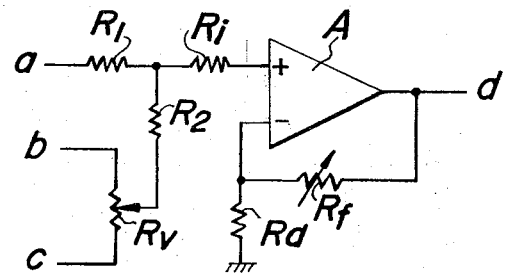

METHOD OF CORRECTING PHOTOELECTRIC MICROSCOPES

This invention relates to methods of correcting photoelectric microscopes and more particularly to a method of correcting a photoelectric microscope adapted to generate a photoelectric signal for detecting the end face position of a specimen.

According to the photoelectric microscope per se, wherein a slit or pinhole is arranged at the image surface produced by an objective lens, and the quantity of light rays passed through the slit or pinhole is converted into a photoelectric signal with the aid of a photoelectric converter such as a solar battery, phototransistor, photomultiplier tube, etc. to obtain a pulse for detecting the end face position of a specimen at each instant when the end face position passes through the center of the slit or pinhole, troubles are usually encountered by possible change in the distribution of the quantity of light rays near the end face of the specimen resulting from changes in configuration of and reflecting power at the specimen and in contrast, illumination, etc., thus giving rather inferior measuring results.

Even when the level of the pulse for detecting the end face position of the specimen is determined with respect to a standard specimen whose distribution in the quantity of light rays near the end face position is high in contrast, the point of detection will be displaced from the true and real end face position of the specimen whose configuration, reflecting power, etc. are different from those of the standard specimen, thus giving rise detecting errors. As a result, the point of detection must be corrected by adding a correcting value to the measured result or provision must be made of any other means suitable for correcting the point of detection.

If it is desired to detect the end face position of a specimen whose thickness is substantially zero by means of the photoelectric microscope in the accuracy near the limit of its definition resolving power, the diffraction of light rays is produced at the end face position and, as a result, the quantity of light rays at the true and real end face position of the specimen is changed in dependence with the conditions of illumination and the numerical aperture of the objective lens.

Moreover, if it is desired to detect the end face position of a specimen having a very high reflecting power, the illumination light rays reflected by the front lens of the objective is reflected again by the specimen so that that portion of the image of the specimen which must be dark becomes bright thus degrading its contrast while the dark level of the photoelectric signal becomes raised. Similarly, in case of detecting the end face position of a partly transparent specimen, the detecting level of the photoelectric signal is raised. As a result, the photoelectric microscope designed to generate a detecting signal at a given level of the photoelectric signal has the disadvantage that it erroneously detects the end face position of the specimen.

An object of the invention is to provide a novel and improved method of correcting a photoelectric microscope that will obviate the above mentioned disadvantages of the conventional photoelectric microscopes and improve the detecting accuracy in a simple and speedy manner.

The above and other objects of the invention will become apparent from the following description and accompanying drawings, in which:

FIG. 2b is a diagram for showing the ratio of the amplitude from the dark level to the detecting level to the amplitude from the detecting level to the bright level for the specimen shown in FIG. 2a;

FIG. 4 is a diagram for illustrating the photoelectric signal resulting from the change of the distribution of the quantity of light rays near the end face of a round bar;

FIG. 5 is a block diagram of an embodiment of the invention for adjusting the gain of the photoelectric signal;

FIG. 6 is a detailed front elevation of the pilot meter shown in FIG. 5;

FIG. 7a, 7b, and 7c are diagrams for illustrating how the gain of the photoelectric signal is adjusted by the apparatus shown in FIG. 5;

FIG. 8 is a block diagram of another embodiment of the invention for adjusting both the gain and level of the photoelectric signal;

FIG. 9 is a detailed front elevation of the pilot meter shown in FIG. 8; and

FIG. 10 is the circuit diagram of the gain control device shown in FIGS. 5 and 8 and the level control device shown in FIG. 8.

Figure 1:
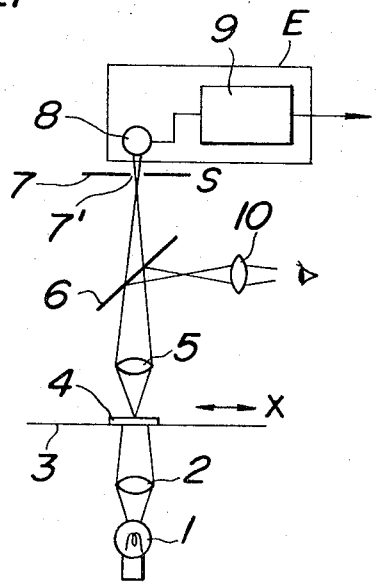
FIG. 1 is a diagrammatic illustration of a photoelectric microscope and light ray paths.

Referring to the drawings, in FIG. 1 is shown a photoelectric microscope in which light rays from a lamp 1 pass through a condenser lens 2 and illuminate a specimen 4 disposed on a table 3 adapted to be moved in directions shown by arrows X. The image of the specimen 4 produced by an objective lens 5 passes through a semitransparent mirror 6 and impinges on a surface S. On the surface S is disposed a screen plate 7 provided with a slit or pinhole 7'. That portion of the light rays which passes through this slit or pinhole 7' is converted into a photoelectric current by means of a photoelectric converting element 8. This photoelectric current is amplified by a preamplifier 9 to produce a photoelectric signal. This photoelectric signal is supplied to a Schmidt circuit adapted to be operated at a given constant level, differential circuit and one shot multibivrator circuit and converted into a pulse for detecting the end face position of the specimen 4.

This detecting pulse is supplied as a trigger pulse to a counter for counting the amount of movement of a digital scale incorporated into the table 3. The instantaneous contents thus obtained by the counter are registered by a register and the records thus obtained are automatically indicated by an indicator tube, digital printer, etc., thereby measuring accurate width of the specimen 4. Since the above maintained circuit elements, inclusive of the Schmidt circuit, etc. are any of those well known in the art, they have no need of detailed descriptions.

The semitransparent mirror 6 reflects a portion of the light rays and the reflected rays are converted to form an image of the specimen 4 seen always through an eyepiece 10.

In the photoelectric microscope as above described, when the table 3 is moved as shown by arrows X to scan the specimen 4 by the slit 7', the photoelectric signal is changed in dependence with the distribution of the quantity of light near the end face of the specimen 4.

This change of the photoelectric signal will now be described with reference to FIGS. 2a, 2b and 2c.

Figure 2A:
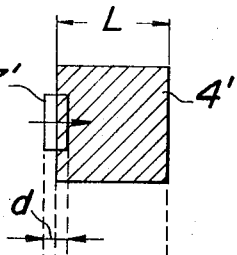
FIG. 2a is a diagram for illustrating an ideal opaque specimen scanned by a slit.

In FIG. 2a is shown an ideal opaque specimen 4' whose thickness is substantially zero and by which almost all of the light rays are not reflected. The specimen 4' is illuminated by light rays of which numerical aperture is sufficiently large with respect to the numerical aperture of the objective lens 5 in a direction perpendicular to the main face of the specimen 4'. If the specimen 4' is scanned by the slit 7' whose width is $d$, the level of the photoelectric signal is changed as shown in FIG. 2b. That is, the level of the photoelectric signal is lowered from the bright level $e_B$ given by the condition at which the slit 7' is out of the specimen 4' to the dark level $e_D$ given by the condition at which the slit 7' overlaps the specimen 4'. At the opposite end face of the specimen 4' is raised the level of the photoelectric signal from the dark level $e_D$ to the bright level $e_B$ as shown in FIG. 2b.

In the above mentioned ideal specimen 4', the detecting level $e_S$ is given by $$e_S = (e_B + e_D)/2$$

Figure 2B:
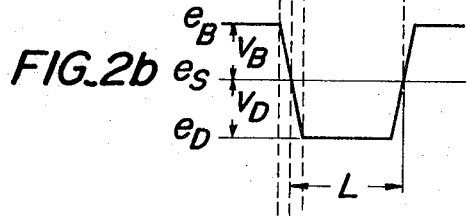

That is in FIG. 2b the ratio of the amplitude $V_D$ from the dark level $e_D$ to the detecting level $E_S$ to the amplitude $V_B$ from the detecting level $e_S$ to the bright level $e_B$ is given by $$V_D : V_B = 1:1$$

Thus, the detecting pulse is produced at each instant when the photoelectric signal crosses the detecting level $e_S$ and hence the width L of the specimen 4' can accurately be measured.

But, if the specimen 4' is opaque and has a very large reflecting power and the operative distance of the objective lens 5 is small, the light rays reflected by the objective lens 5 is again reflected by the specimen 4' onto the objective lens 5. As a result, the surface of the specimen 4' does not become dark and the dark level $e_D$ is raised to $e_D'$ as shown in FIG. 2c.

Figure 2C:
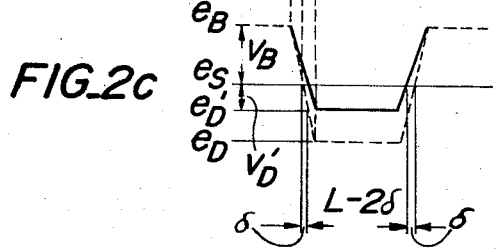
FIG. 2c is a diagram similar to FIG. 2b, but showing the ratio for a specimen whose dark level is raised.

If the specimen 4' is semitransparent and does not completely interrupt the light-rays which hence partly penetrate therethrough, the dark level $e_D$ is also raised from $e_D$ to $e_D'$ as shown in FIG. 2c. In this case, if the detecting level $e_S$ is made constant, the detecting pulse is generated at each position displaced from the position shown in FIG. 2b by $\delta$. Thus, the end face position of the specimen 4' is erroneously detected. In case of measuring the width L of the specimen 4', the error becomes $2\delta$ and the erroneous width $L-2\delta$ is measured.

If the pinhole 7' of the photoelectric microscope is so small that the definition resolving power of the objective lens 5 reaches to its limit value and it is desired to detect the end face position of the specimen 4' under such condition that the definition resolving power of the objective lens 5 is less than its limit value, the influence of the diffraction which light rays undergo in passing by the edges of the specimen 4' at its end face position must be taken into consideration.

Theoretical treatises and experimental tests have yielded the result that the quantity of light at the boundary of the end face of a specimen whose contrast is ideal, for example, a knife edge is dependent upon the numerical aperture of an illumination lens and the numerical aperture of an objective lens, that if the numerical aperture of the illumination lens is far greater than that of the objective lens the quantity of light at the boundary of the end face of the specimen is about one-half smaller than the maximum quantity of light, and that if the numerical aperture of the illumination lens is substantially equal to that of the objective lens the quantity of light at the boundary of the end face of the specimen is about one/third smaller than the maximum quantity of light as mentioned in Journal of the Optical Society of America, April 1963, Vol. 53, No. 4, "Some Experimental Measurement of Diffraction in Low-resolution Microscopy."

Figure 3:
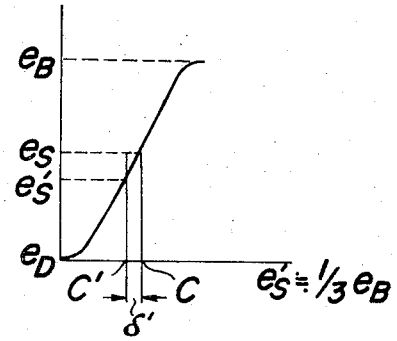
FIG. 3 is a curve for illustrating the change of the photoelectric signal resulting form the diffraction of light rays at the end face position of a specimen.

FIG. 3 shows a distribution curve of the change in the quantity of light at the boundary of the end face of the above mentioned specimen 4' having the ideal contrast and scanned by the slit 7' under the condition that the numerical aperture of the illumination lens is substantially equal to that of the objective lens. As seen from FIG. 3, the quantity of light $e_S'$ at the boundary position C' of the end face of the specimen is about one/third smaller than the maximum quantity of light $e_B$. Thus, if the quantity of light of detecting the end face position of the specimen is defined by a detecting level $e_S$ which is about one/half smaller than the maximum quantity of light $e_B$, the detecting level $e_S$ thus defined erroneously detects the end face position C displaced from the end face position C' by $\delta'$.

The distribution of the quantity of light near the end face of a specimen having a certain thickness is given by a curve whose shape is different from and more complex than the curve shown in FIG. 3, the shape of curve being changed in dependence with the configuration, reflecting power at the side edge of the specimen and with illumination, etc.

FIG. 4 shows a distribution curve of the change in the quantity of light at the boundary of the end face of a round bar 4'' whose radius is r. In the present example, use is made of a telecentric illumination having an aperture angle $\alpha$ and the image of the round bar 4'' produced by the objective lens 5 is measured. The pencil of light rays impinging on the objective lens 5 are composite light rays consisting of penetrated light rays and light rays reflected by the side surface of the round bar 4'', as a result, the curve showing the distribution of the quantity of light become complex one as shown in FIG. 4. This curve changes in shape in dependence with the illumination aperture angle $\alpha$ and the radius r and the reflecting power of the round bar 4''. The quantity of light at the position C where the generating line along the periphery of the end face of the round bar 4'' is present also changes in dependence with the above mentioned three conditions. Thus, the detecting level $e_S$ produces a detecting error $\delta''$.

As stated hereinbefore, the change in the distribution of the quantity of light near the boundary of the end face of the specimen causes occurrence of the erroneous detecting pulses in a systematic manner. If the conditions were worse, the large error would make the measurement for the end face position of the specimen meaningless.

It might be considered to eliminate such error by taking the conditions of the specimen into consideration and hence by adding a correcting value. But, such method is complex in data treatment and, as a result, an excellent accuracy could not easily be obtained.

Moreover, it might be considered to decrease the error by taking the conditions of the specimen into consideration and hence by suitably changing the detecting level $e_S$. But, it is difficult to simultaneously indicate the detecting level $e_S$, bright level $e_B$ and dark level $e_D$. Thus, this method could not be applied to practical fields.

The present invention makes the detecting level $e_S$ fixed while the bright level $e_B$ and the dark level $e_D$ are suitably adjusted so as to correct the above mentioned error. That is, the invention makes the detecting level $e_S$ fixed while the level of the photoelectric signal as a whole is made adjustable or the gain of the photoelectric signal is made adjustable and further the existing value of the photoelectric signal are indicated by marks provided along the scale of a pilot meter so as to easily correct the position at which the detecting pulse is produced, thereby improving the detecting accuracy.

In FIG. 5 is shown an embodiment for adjusting the gain of the photoelectric signal according to the invention, in which E designates the photoelectric converter comprising the photoelectric element 8 and preamplifier 9 shown in FIG. 1, F a gain control device for manually adjusting the gain of the photoelectric signal, T a wave form shaping circuit comprising the above mentioned Schmidt circuit, etc. incorporated therein and adapted to produce a trigger pulse at an instant when the input signal reaches to its given level, and M a pilot meter for indicating the change of the photoelectric signal from the gain control device F. As shown in FIG. 6, the pilot meter M is provided along its scale with a mark $e_2$ showing a level at which the detecting pulse is produced at the instant when a indicator needle $i$ passes through the mark $e_2$.

FIG. 7a shows a photoelectric signal produced when the ideal opaque specimen 4' (FIG. 2a) whose thickness is substantially zero and by which almost all of the light rays are not reflected is scanned by the slit 7' whose width is $d$. The end face position of this specimen 4' is correctly detected when the ratio of the amplitude $V_D$ from the dark level $e_D$ to the detecting level $e_S$ to the amplitude $V_B$ from the detecting level $e_S$ to the bright level $e_B$ is equal to 1:1.

FIG. 7b shows a photoelectric signal produced when a translucent specimen by which light is partly reflected or through which light is partly penetrated is scanned by the slit 7'. In this case, the dark level $e_D$ is raised to a level $e_D'$, but the bright level $e_B'$ is not changed. Thus, $e_B'=e_B$ so that the condition that $V_D':V_B'=1:1$ is not satisfied thus producing the error $\delta$ shown in FIG. 2c.

In such a case, the gain control device F shown in FIG. 5 is so adjusted that the gain of the photoelectric signal from the photoelectric converter E is made, for example, small to lower the bright level $e_B'$ to a new level $e_B''$ and to change the dark level $e_D'$ to a new level $e_D''$. The rate of change of the dark level $e_D'$ to $e_D''$ is the same as that of the bright level $e_B'$ to $e_B''$ so that the rate of change of $e_D'$ to $e_D''$ is small. Thus, the gain control device F is capable of adjusting $V_D'':V_B''$ to $V_D'':V_B''=1:1$.

The gain control device F is so adjusted by observing the deflection of an indicator needle $i$ of the pilot meter M shown in FIG. 6 that its deflected position shown by a full fine from the mark $e_2$ showing the detecting level $e_S$ is made equal to its deflected position shown by dotted lines from the mark $e_2$. Then, the condition that $V_D'':V_B''=1:1$ is satisfied and the preparatory setting operation of the apparatus shown in FIG. 5 is completed.

Now, the table 3 with the specimen 4 disposed thereon is moved reciprocately as shown by arrows X in FIG. 1 and when the center of the slit 7' passes through each end face of the specimen 4' as shown in FIG. 2a a detecting pulse is generated, with the result that the width L of the specimen 4' can accurately be measured irrespective of the degradation of contrast near the end face position of the specimen 4'.

As stated hereinbefore, the observation of the deflection of the indicator needle $i$ of the pilot meter M renders it possible to completely correct the degradation of contrast near the end face position of the specimen resulting from the reflection or penetration of the light rays and to generate a detecting pulse at the detecting which is the same as that of the ideal specimen shown in FIG. 7a, thereby remarkably improving the accuracy of measurement.

As above mentioned, the condition that $V_D'':V_B''=1:1$ is not always able to detect the correct end face position of a specimen resulting from the configuration of the specimen, reflecting power at the side face thereof, etc. Thus, the specimens are classified into several groups each of which has its ratio of $V_D'':V_B''$ inherent thereto and these ratios of the groups are listed, for example, in a table. Then, the pilot meter M is observed to determine a correct ratio with reference to the given ratio of $V_D'':V_B''$, with the aid of the gain control device F, with the result that the detecting error can remarkably be decreased and the face end position of the specimen can be measured in a reproducible manner.

The gain control device F may be replaced by an illumination supply source 1 whose quantity of light is variable to obtain the same result as that obtained by the gain control device F.

In FIG. 8 is shown another embodiment for adjusting both the gain and the level of the photoelectric signal according to the invention, wherein between the photoelectric converter E and the gain control device F is connected a level control device G for adjusting the total level of the photoelectric signal from the photoelectric converter E. The apparatus thus connected and arranged is capable of completely correcting the detecting error resulting from the dark level $e_D'$ raised from the dark level $e_D$ (FIG. 7b). That is, the level control device G may be adjusted to lower the dark level $e_D'$ by $V_G$ to bring the $e_D'$ into coincidence with $e_D$ and then the gain control device F is adjusted to raise $e_B'$ (lowered by the level control) to $e_B$, thereby obtaining the ideal pattern of the photoelectric signal as shown in FIG. 7a.

FIG. 9 shows in details the pilot meter M shown in FIG. 8 in which a mark $e_2$ designates a level for producing a given detecting pulse and a mark $e_3$ shows a given dark level. Marks $e_4$, $e_4'$ and $e_4''$ indicate any of bright levels which may be selected with reference to any desired ratio of $V_D'':V_B''$ listed beforehand in the table, etc.

The level control device G and the gain control device F are adjusted as above described while observing the deflection of the indicator needle $i$ of the meter M such that the indicator needle $i$ is made coincident with the mark $e_3$ showing the dark level $e_D$ and that the indicator needle $i$ is made coincident with $e_4$, $e_4'$ or $e_4''$ dependent of the ratio of $V_D'':V_B''$ which is necessary for the specimen whose width is to be measured. Since the marks $e_2$ and $e_3$ are fixed, the determination of the desired ratio of $V_D'':V_B''$ may easily be effected if compared with the meter M shown in FIG. 6. The selection of any one of the marks $e_4$, $e_4'$, $e_4''$ showing the bright levels permits the ratio of $V_D'':V_B''$ to change to any desired ratio. The positions of the marks $e_4, e_4', e_4''$ are determined by the end face conditions of the specimen and can be marked beforehand along the scale of the meter M or any other bright levels may be marked along the scale depending on the end face condition of any other specimens. Thus, the end face position of the specimen can be reproduced in the same measuring manner.

As stated hereinbefore, the successive adjustments of the level control device G and the gain control device F are important, since they provide a way of correcting the detecting error resulting from the degradation of contrast at the end face position of the specimen. Moreover, depending on the selection of any one of the bright level marks $e_4$, $e_4'$ and $e_4''$, etc., it is possible to generate a detecting pulse at a number of different ratios of $V_D'':V_B''$ which are suitable for the end face conditions of various kinds of specimens, thereby considerably improving the accuracy and reliability of the measured data.

In the apparatus shown in FIG. 8, the gain control device F may be replaced by an illumination light source 1 whose quantity of light is made variable to obtain the same result as in the case of using the gain control device F.

In FIG. 10 is shown the circuit diagram of the level control device G shown in FIG. 8 and of the gain control device F shown in FIGS. 5 and 8, in which reference $a$ designates an input terminal to be connected to the photoelectric converter E and $d$ an output terminal to be connected to the wave form shaping circuit T and to the pilot meter M.

A bias voltage is applied across terminals $b$ and $c$ of a variable resistor $R_v$ which is movable to change the level of the photoelectric signal from the photoelectric converter E. Thus, the variable resistor $R_V$ plays a role of the level control device G shown in FIG. 8.

Provision is made of an amplifier A provided at its feed back circuit with a variable resistor $R_f$. If the resistance of the variable resistor $R_f$ is changed, the amplification factor of the output signal of the amplifier A becomes changed. Thus, the amplifier A with the variable resistor $R_f$ plays a role of the gain control device F shown in FIGS. 5 and 8.

The embodiments of the invention described above are applied to the photoelectric microscope illuminated by transparent light rays. It is to be understood, however, that the invention may also be applied to photoelectric microscopes illuminated by reflected light rays. Any other changes may be made by those skilled in the art within the scope of the invention as expressed in the appended claims. For example, the detecting error may be corrected by adjusting the level only of the photoelectric signal. As the pilot meter M, use may be made of a conventional voltmeter or ammeter and eventually a digital voltmeter. Since the ratio of $V_D'':V_B''$ shown in FIG. 6 or the ratio of $V_D:V_B$ shown in FIG. 9 is equal to or smaller than 1:1, it is preferable to locate the mark $e_2$ showing the detecting level $e_S$ for generating the detecting pulse at that portion of the scale which is nearer to the dark level instead of locating it at the center of the scale of the pilot meter M as shown in FIGS. 6 and 9.

In the embodiment shown in FIG. 10, the gain control device F is constituted by an active element such as the variable gain amplifier A, $R_f$. The gain control device F may also be constituted by a passive element such as an attenuator. The gain of the photoelectric signal may also be adjusted by means of a filter arranged at that portion of the light ray path at which the light rays are impinged on the filter prior to impinging on the photoelectric converter E.

For ease of identification, the earlier described marks $e_2$ and $e_3$ may respectively be termed "first" and "second" marks, while $e_4$, $e_4'$, $e_4''$ could be designated as "further" marks. In a similar manner, the graduations $V_D''$, $V_B''$, $V_D$ and $V_B$ respectively constitute "first," "second," "third" and "fourth" graduations. The ratio between the first two graduations is the "first ratio," while that between the latter two is the "second ratio." These designations appear also in the claims.

What is claimed is:

1. An apparatus for generating a photoelectric signal for detecting end face edges of specimens, comprising in combination: a photoelectric microscope for moving said edges of the specimens across the center of a slit; a photoelectric converter for converting the light ray after scanning said slit into a photoelectric pulse; a gain control device in series connection with said converter; a wave-form shaping circuit connected to said gain control device and producing a pulse for detecting said edges; and a pilot meter connected to the junction between said gain control device and said shaping circuit, having a uniformly graduated scale, and being provided along the latter with at least one first mark showing a level at which said detecting pulse is produced at the instant when said edges pass through said center of the slit; whereby said gain control device is set such that the ratio between first graduations $V_D''$ on said scale from a dark level to said first mark, on the one hand, and second graduations $V_B''$ from said first mark to a bright level, on the other hand, is equal to $V_D''/V_B''$ inherent in the specimen, said ratio being predetermined and listed beforehand in a table.

2. The apparatus as defined in claim 1, further comprising a level control device connected between said converter and said gain control device, and wherein said pilot meter is provided along said scale with a second mark showing a standard dark level and with a plurality of further marks showing bright levels inherent in a plurality of the specimens, whereby said level control device and said gain control device are set such that a second ratio between third graduations $V_D$ from said second mark to said first mark, on the one hand, and fourth graduations $V_B$ from said first mark to one of said further marks, on the other hand, is equal to $V_D/V_B$ inherent in one of the specimens, said second ratio being predetermined and listed beforehand in said table.

* * * * *